United States Patent Office 3,590,016
Patented June 29, 1971

---

3,590,016
POLYMERIZABLE MONOMERS
John J. Hopwood, Glen Waverley, Victoria, Australia, assignor to Balm Paints Limited, Melbourne, Victoria, Australia
No Drawing. Filed July 28, 1969, Ser. No. 845,557
Claims priority, application Australia, Aug. 8, 1968, 41,874/68
Int. Cl. C08f *3/62, 15/00, 27/04*
U.S. Cl. 260—29.6                                      7 Claims

ABSTRACT OF THE DISCLOSURE

Novel polymerisable monomers which are ethylenically unsaturated esters of the formula:

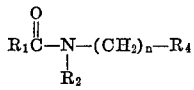

wherein $R_4$ comprises a polymerisable ethylenic double bond. Homopolymers and copolymers of the monomers are disclosed and in one embodiment provide water-dispersible film-forming polymer which may be electrophoretically deposited on a conducting substrate.

---

This invention relates to novel polymerisable monomers and to homopolymers and copolymers comprising residues thereof.

The polymerisable monomers of the present invention are ethylenically unsaturated esters of the formula:

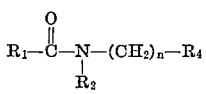

wherein $n$ is an integer having the value 2 to 18 inclusive,
$R_1$ is a saturated or unsaturated linear or branched hydrocarbon chain containing 12 to 18 inclusive carbon atoms,
$R_2$ is a hydrogen atom, a methyl, hydroxy alkyl, saturated or unsaturated alkyl group containing 2 to 18 inclusive carbon atoms, an alkylaryl or cycloalkyl group or a group of the structure:

wherein $R_3$ is a hydrogen atom, a methyl, hydroxy alkyl, alkylaryl, or cycloalkyl group or a saturated or unsaturated alkyl group containing 2 to 18 inclusive carbon atoms, and
$R_4$ is an ethylene derivative of the structure:

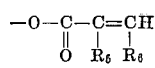

wherein $R_5$ may be hydrogen, chlorine, methyl, methyl carboxy or methyl carboxy ester and $R_6$ may be hydrogen, methyl, carboxyl, carboxy ester or amide.

Thus suitable components $R_1$ are, for example, the hydrocarbon chains occurring in natural oils and fats, e.g. lauryl, myristyl, palmityl, stearyl, oleyl, linoleyl and linolenyl entities. A convenient source of these materials is the group of commercial products known as, for example, linseed, safflower, tall oil or soya fatty acids, which comprise two or more different hydrocarbon chains.

Similar entities to the above may also be used as component $R_2$ and/or component $R_3$.

The nature of the component $R_4$ taken as a whole is governed by the selection of the substituents $R_5$ and $R_6$. Suitable components $R_4$ are, for example:

| $R_5$ | $R_6$ | $R_4$ |
|---|---|---|
| H | H | Acrylate. |
| H | COOH | Maleate, fumarate. |
| H | CO·NH$_2$ | Maleamate. |
| Cl | COOH | Chlor-maleate. |
| CH$_3$ | H | Methacrylate. |
| CH$_2$·COOH | H | Itaconate. |
| CH$_2$·COOH | COOH | Aconitate. |

One method of preparing the polymerisable monomers is by the esterification or trans-esterification of a suitable primary alcohol with an ethylenically unsaturated carboxylic acid, acid anhydride or carboxylic acid ester which provides the desired component $R_4$. For example, fumaric acid or maleic anhydride can be esterified with safflower fatty acids monoethanolamide to form the corresponding acid ester, which is an unsaturated monomer of the above formula. Alternatively, the trans-esterification of methyl methacrylate with safflower fatty acids monoethanolamide (with the elimination of methanol) also provides an unsaturated monomer of the above formula.

A suitable primary alcohol may be prepared by, for example, the esterification of an alkanolamine under such conditions that there is little if any attack on the primary hydroxyl group and essentially only amide groups are formed. Alternatively the suitable primary alcohol may be made by a transesterification process from an alkanolamine and the methyl ester of a fatty acid.

The alkanolamine itself may be prepared by the reaction of an alkylene oxide with a primary amine or ammonia. The nature of the group —(CH$_2$)$_n$— in the above structural formula will then depend on the particular alkylene oxide used. For example, ethylene oxide yields a group of the formula —CH$_2$—CH$_2$—, that is —(CH$_2$)$_n$— where $n=2$, whereas 1,2-propylene oxide yields a group of the formula

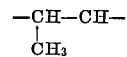

that is —(CH$_2$)$_n$— where $n=3$. Furthermore, 2,3-butylene oxide provides a group of the formula

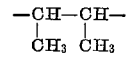

that is —(CH$_2$)$_n$—where $n=4$.

In the preferred structures, which provide readily prepared and polymerisable monomers, $R_4$ is an acrylate, maleate, fumarate, methacrylate or itaconate entity and $n$ is 2.

In general, we have found that monomers according to the invention can be homopolymerised or copolymerised satisfactorily under normal addition polymerisation conditions. Suitable co-monomers with which they may be polymerised are, for example,
aromatic substituted ethylenes, e.g. styrene, α-methyl styrene and the "vinyl toluenes";

vinyl acetate; and lower saturated alcohol esters of acrylic and methacrylic acid, e.g. their methyl, ethyl and n-butyl esters.

The homopolymerisation or copolymerisation is carried out by normal addition polymerisation techniques in the presence of free radical initiators, for example benzoyl peroxide or azodiisobutyronitrile. However, as further described hereinunder it may be desirable in certain circumstances to limit the upper temperature under which the reaction is carried out to inhibit certain observed side-reactions.

Accordingly, we further provide an addition polymer comprising monomer residues of the structure:

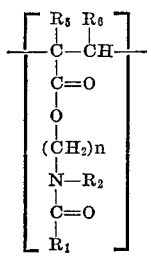

wherein $n$, $R_1$, $R_2$, $R_5$ and $R_6$ have the above-described meanings.

When used as film-forming polymers in coating compositions the polymers should be homopolymers or copolymers comprising at least 5% by weight of units of the above structure.

Polymers of this type need not, however, be prepared by the direct polymerisation of copolymerisation of the corresponding unsaturated monomer but instead by an indirect method. Polymers prepared by a direct or indirect method may still have substantially the same composition.

A polymer according to the invention may be prepared by the indirect method of simultaneous polymerisation of monomer comprising unsaturated carboxylic acid providing the component $R_4$ and co-reaction of the carboxyl groups of the unsaturated acid with the desired primary alcohol. For example, a higher alkyl monoalkanolamide, a polymerisable co-monomer, e.g. styrene, and an ethylenically unsaturated acid anhydride may be coreacted in the presence of a free radical initiator to concurrently form an unsaturated acid ester of the alkanolamide and a copolymer of that monomer with the co-monomer.

Alternatively, a polymer or copolymer comprising unsaturated carboxylic acid providing the component $R_4$ may be prepared and then post-esterified with a selected alcohol.

For example, a polymer comprising polymer residues of the structure:

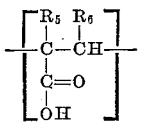

may be prepared and at least partially post-esterified with a suitable alcohol to form a polymer according to the invention. Acidic monomer or their anhydrides which may be homopolymerised or copolymerised to provide acidic polymers suitable for at least partial post-esterification include, for example, acrylic acid, methacrylic acid, maleic acid, fumaric acid, and aconitic acid. Suitable co-monomers include for example alkyl esters of acrylic and methacrylic acids, di-isobutylene, styrene and the vinyl toluenes.

When $R_1$ is an unsaturated hydrocarbon chain such as a linolenyl chain, the unsaturation of the chain itself may enter into a free radical initiated polymerisation reaction. To avoid such side-reactions, which can result in low yield or gelation of the polymer, we prefer when using this type of unsaturated hydrocarbon component to first prepare a suitable polymer as described above and then at least partially esterify it with the unsaturated alcohol.

Polymers according to the invention are suitable for use as film-forming polymers in surface-coating compositions, for which purpose they may be used as solutions in suitable solvents, as aqueous latices or as non-aqueous dispersions.

A particularly useful application of one class of these polymers is as components of surface-coatings in the form of solutions or dispersions, usually of colloidal dimensions, in aqueous liquids. For this purpose the polymers may be made soluble or self-dispersible by neutralising carboxyl groups contained therein with water-soluble bases, for example ammonia, monoethanolamine, diethanolamine, triethanolamine, N-methyl ethanolamine, N-aminoethyl ethanolamine, ethylene diamine, diethylenetriamine, propylene diamine, triethylamine, dimethylaminoethanol, sodium hydroxide and potassium hydroxide.

It is known that to be utilised in this way a polymer must have a certain minimum acid value, which is usually of the order of 30 mgm. KOH per gm. of resin or greater. Carboxyl groups may be provided in the polymer by the use therein of monomer of the above-disclosed type in which the required groups are introduced by suitable substituents $R_5$ and/or $R_6$ of the component $R_4$. Alternatively, when the polymer is a copolymer the carboxyl groups may be provided at least in part by the selection of a carboxyl-containing co-monomer, e.g. acrylic or methacrylic acid. Also, when the polymer according to the invention is prepared indirectly from an acidic polymer, the acidic groups may be only part-esterified with a suitable alcohol.

We have observed, however, that when preparing some polymers comprising repeating monomer units of the above general formula in which $R_6$ is selected to be a carboxyl group, the final acid value may be lower than anticipated. Without ascribing any particular mechanism to this side-reaction we have observed that it is increased by the use of relatively high reaction temperatures. In general, the side-reaction does not appear to have any detrimental effect on the performance of the polymer although obviously if the polymer is intended to be, for example, subsequently solubilised in water by reaction with a soluble base, it could result in a lowering of the acid value to a point where this cannot be done. We usually prefer, therefore, to adjust our polymerisation reaction temperatures and/or use more vigorous initiators and accelerators to minimise any observed side-reactions and hence to ensure only minor departures from the desired overall polymer composition.

The carboxyl-containing polymers are dissolved or dispersed in the aqueous liquid in the presence of the water-soluble base, with which they may have been pre-reacted or which may be present in solution in the aqueous liquid. The aqueous liquid may be water alone but more frequently it will comprise a minor proportion of a water-soluble organic liquid, e.g. ethylene glycol mono-n-butyl ether, which is known to increase the ease of incorporation of a polymer in an aqueous liquid.

Aqueous polymer solutions or dispersions of the above type are especially useful for the preparation of coating compositions to be applied to substrates by electrophoretic deposition.

For this application in particular, the present invention provides a convenient method of introducing both hydrocarbon chains and carboxyl groups at the desired level of concentration into an addition polymer; it being known that the proportions of each of these constituents in a polymer can influence the cure and application characteristics of a coating composition in an electrophoretic deposition process. Under favourable conditions, e.g. when the hydrocarbon chain is not unduly susceptible to attack by free radicals, the film-forming polymers can be prepared by a simple one-stage polymerisation reaction.

For use in electrodeposition the polymers preferably have an acid value in the range 30–200 mg. KOH per. gm.; in the coating bath from 30–100% of the acid groups may be neutralised by a water-soluble base, for example one selected from those already mentioned above.

The invention is illustrated by the following examples in which all parts are expressed by weight.

EXAMPLE 1

Preparation of a polymerisable monomer according to the invention in which:

$R_2$=safflower fatty acids residue
$R_2$=H
$n=2$
$R_5$=CH$_3$
$R_6$=H

The following materials were charged into a reaction vessel fitted with a stirrer, condenser and Dean and Stark trap:

|  | Parts |
|---|---|
| Methyl methacrylate | 50 |
| Safflower monoethanolamide | 107 |
| Toluene | 107 |
| p-Methoxy phenol | 0.1 |

The batch was heated to reflux, trace quantities of water removed through the trap, 0.85 parts of n-butyl titanate added as trans-esterification catalyst and refluxing continued for a further 3 hours.

A total of 39.6 parts of reflux condensate was then withdrawn from the batch, keeping the vapour temperature during this time at below 85° C.

Analysis of the remaining product showed it to be essentially safflower monoethanolamide methacrylate.

EXAMPLE 2

Preparation of a polymerisable monomer according to the invention in which:

$R_1$=safflower fatty acids residue
$R_2$=H
$n=2$
$R_5$=Cl
$R_6$=COOH

The following materials were charged into a reaction vessel fitted with a stirrer, condenser and Dean and Stark trap:

|  | Parts |
|---|---|
| Chlormaleic anhydride | 6.8 |
| Safflower monoethanolamide | 16.3 |
| Xylene | 23.2 |

The batch was refluxed for 4 hours during which time 0.9 part of water were removed by the trap.

Analysis of the reaction product showed it to be essentially safflower monoethanolamine monochlormaleic ester.

EXAMPLE 3

Preparation of a polymerisable monomer according to the invention in which:

$R_1$=safflower fatty acids residue
$R_2$=CO.CH$_3$
$n=2$
$R_5$=H
$R_6$=COOH

The maleic half ester of safflower monoethanolamide was prepared by reacting stoichiometric proportions of safflower monoethanolamide and maleic anhydride together at 110–115° C. for several hours, until analysis confirmed virtual removal of the anhydride structure. The reaction was carried out in the presence of xylene and a hydrocarbon liquid of aromatics content 96–98% and boiling range 185–215° C. to give a product of the following approximate composition:

|  | Parts |
|---|---|
| Safflower monoethanolamide maleic half ester | 105 |
| Hydrocarbon liquid | 68 |
| Xylene | 28 |

The above product together with 31 parts of acetic anhydride was warmed slowly to 120° C. in a reaction vessel fitted with a stirrer and reflux condenser. The exothermic reaction which started was allowed to subside and the batch held at 120° C. for a further 2 hours. Excess acetic anhydride was then removed by concurrent addition of toluene and stripping off of reflux condensate until no further acid was detected in the condensate. Infra-red analysis of the product, a solution of acylated safflower monoethanolamide maleic half ester confirmed an increase in the peak at 1650 cm.$^{-1}$ over the non-acylated compound and no detectable change in the peak at 820 cm.$^{-1}$ (attributed to maleic unsaturation).

EXAMPLE 4

Preparation of a homopolymer of a copolymerisable monomer according to the invention in which:

$R_1$=safflower fatty acids residue
$R_2$=H
$n=2$
$R_5$=H
$R_6$=COOH

A reaction vessel fitted with a stirrer and reflux condenser was charged with 50 parts of a solution in xylene/hydrocarbon liquid of safflower monoethanolamide maleic half ester prepared according to Example 3, 200 parts of toluene and 0.25 parts of di-tert.-butyl peroxide.

The reactants were maintained at 100–110° C. with stirring for 4 hours to yield a solution of polymerised monomer.

EXAMPLE 5

Preparation of a polymerisable monomer according to the invention and in which:

$R_1$=safflower fatty acids residue
$R_2$=H
$n=2$
$R_5$=CH$_2$.COOH
$R_6$=H

The monomer is used to prepare a copolymer with styrene co-monomer.

The following materials were charged into a reaction vessel fitted with a stirrer, condenser and Dean and Stark trap:

|  | Parts |
|---|---|
| Itaconic acid | 65 |
| Safflower monoethanolamide | 160 |
| N,N-dimethyl formamide | 65 |
| Toluene | 250 |
| p-toluene sulphonic acid | 1 |

The mixture was heated to and held at reflux until no more water was evolved (13 parts). Analysis of the reaction product showed it to be a 42% solution of the itaconic acid half ester of safflower monoethanolamide.

The following mixture:

|  | Parts |
|---|---|
| Reaction product above | 14 |
| Styrene | 10 |
| Xylene | 10 |
| Di-tert-butyl peroxide | 1 | was heated under reflux vessel for 6 hours, by which time the non-volatile content of the batch had risen to 47% by weight, indicating virtually complete polymerisation of monomer.

The copolymer solution so-formed was formulated into a coating composition by adding 1.2 parts of a cobalt naphthenate solution (3% Co by weight) in mineral spirits as an autoxidation catalyst.

A film of approximately 0.01 inch wet film thickness was cast on glass from this mixture using a film applicator blade and then allowed to dry in air in 25° C. The film was touch dry in less than 1 hour and insensitive to attack by petrol after 48 hours at 25° C.

EXAMPLE 6

Preparation of a copolymer comprising styrene, methyl methacrylate and polymer units as above-defined in which:

$R_1$=safflower fatty acids residue
$R_2$=H
$n$=2
$R_5$=H
$R_6$=COOH

An addition copolymer is first prepared and the polymer units formed in situ by a subsequent reaction.

An addition polymer was prepared by stirring and heating to reflux in a reaction vessel 225 parts of xylene and 225 parts of methyl ethyl ketone, to which was added a mixture of 200 parts of styrene and 190 parts of methyl methacrylate at a uniform rate over a period of 2 hours. Starting at the same time as the above addition, a solution of 8 parts of benzoyl peroxide and 96 parts of maleic anhydride in a mixture of 20 parts of N,N-dimethylformamide, 100 parts of xylene and 100 parts of methyl ethyl ketone was added to the refluxing solvent at a uniform rate over 3 hours. This mixture was then refluxed a further 3 hours. A solution of an addition polymer providing chemically reactive acid anhydride groups was formed.

30 parts of this addition polymer and 9.2 parts of a safflower monoethanolamide were heated at 40° C. under a nitrogen atmosphere in a sealed container for 2 weeks. The product so-produced had an acid value equivalent to 42 mg. KOH per gm. solid polymer.

This product was formulated as a coating composition by adding 1.2 parts of a cobalt naphthenate (3% by weight of cobalt metal) solution in mineral spirits as an autoxidative catalyst.

A film of approximately 0.010 inch wet thickness was cast on glass from this mixture using a film applicator blade and was then allowed to air-dry at 25° C. The film was touch dry in 1.5 hours, print free in 8 hours and cross-linked to a petrol insensitive film after 48 hours at 25° C.

EXAMPLE 7

Preparation of a copolymer comprising styrene, methyl methacrylate and polymer units as above-defined in which:

$R_1$=safflower fatty acids residue
$R_2$=CH$_3$
$n$=2
$R_5$=H
$R_6$=COOH

An addition copolymer is first prepared and the polymer units then formed in situ by a subsequent reaction.

The polymer was prepared by the general method of Example 6 but replacing the safflower monoethanolamide of that example with an equivalent weight of safflower N-methyl ethanolamide.

The polymer, when tested as a coating composition by the method of Example 5, had similar drying characteristics.

EXAMPLE 8

Preparation of a copolymer similar to that of Example 6 but replacing the safflower fatty acids residues of that example with linseed fatty acids residues.

The general method of Example 6 was repeated except that 9.0 parts of linseed monoethanolamide was used in place of the safflower monoethanolamide. A film catalysed and prepared as described in Example 6 was touch dry in less than one hour and petrol insensitive after 40 hours at 25° C.

EXAMPLE 9

Preparation of a copolymer comprising styrene and polymer units as above-defined in which:

$R_1$=safflower fatty acids residues
$R_2$=H
$n$=2
$R_5$=H
$R_6$=COOH

An acidic addition polymer is reacted with safflower monoethanolamide to form the above polymer units in situ and then converted into an aqueous solution in which residual carboxyl groups of the polymer are reacted with a water-soluble base.

A reaction vessel fitted with a stirrer, thermometer, reflux condenser and an inert gas sparge, was charged with 320 parts of safflower monoethanolamide, stirred and heated to 190° C. under a slight nitrogen pressure. While stirring continued 430 parts of a styrene-maleic anhydride copolymer containing 25 mole percent maleic anhydride and having a molecular weight of about 1900 was introduced at such a rate that the internal temperature of the system did not fall below 175° C. This mixture was held under reflux at 190–195° C. for 2½ hours, cooled to 140° C. over a period of 1 hour and then filtered hot through fine cheese cloth. The copolymer thus obtained was in the form of a viscous oil and had a molecular weight of about 3500. The acid value was found to be equal to 58 mg. KOH per gm. solid.

To 50 parts of this copolymer were added 10 parts isopropanol and 10 parts of ethylene glycol mono-n-butyl ether and the mixture heated to 50° C.; to give a clear copolymer solution. A solution of 4.1 parts of dimethylaminoethanol in 30 parts of water was then added and formed a clear, homogeneous copolymer solution. To this solution was added 1.0 parts of a water-dispersible drier containing 24 weight percent lead and 0.4 parts of a water-dispersible drier containing 6% cobalt. A film was cast on glass from this mixture using a film application blade of 0.010 inches clearance and allowed to dry in air at 25° C. The film was petrol and alkali resistant after drying for 2 days.

EXAMPLE 10

Preparation of a copolymer comprising styrene and polymer units as above-defined in which:

$R_1$=safflower fatty acids residues
$R_2$=H
$n$=2
$R_5$=H
$R_6$=H

An addition polymer is first prepared and the polymer units formed in situ by a subsequent reaction.

250 parts of ethyl acetate, 125 parts of a high-boiling (170–190° C.) aromatic hydrocarbon, were placed in a reaction vessel, stirred and heated to reflux under a slight nitrogen pressure. A mixture of 294 parts styrene and 25 parts benzoyl peroxide was added to the charge at a uniform rate over a period of 2 hours. Starting at the same time as the above addition 72 parts of acrylic acid were added to the charge at a uniform rate over a period of 3 hours. Refluxing was continued for a further 2 hours, 253 parts of safflower monoethanolamide were then added and the heating continued to distil off approximately 300 parts of reflux condensate. The batch temperature had then risen to 185° C. One part of trichloracetic acid was added as an esterification catalyst and the batch refluxed for approximately 3 hours. During this period approximately 110 parts of a high-boiling (170–190° C.) aromatic solvent was added to control the viscosity and reaction water release. After this time the evolution of water had virtually ceased, a total of 10.5 parts having been collected. The batch was cooled slightly and 150 parts of white spirit were carefully added.

The final product was a viscous, clear solution infinitely dilutable with aliphatic hydrocarbon and having an acid value just below 25 mgm. KOH per gm. (on solids) and a solids content of 68% by weight. To 100 parts of the product were added 3 parts of a solution of lead naphthenate solution containing 24% metal by weight and 0.6 parts cobalt octoate solution containing 6% metal by weight. The mixture was diluted with approximately 30 parts of aliphatic hydrocarbon (boiling range 155–195° C.) and films brushed out on a glass plate. After drying in air at ambient temperature 4 hours the film was tack free; after 6 hours it could be recoated. On aging in air at 25° C. for 10 hours the film was elastic, tough, adhered strongly to the plate and was petrol resistant. Another portion of the product was pigmented by grinding titanium dioxide pigment into it in a volume ratio of 0.5 part of pigment to 1.0 part solid resin. After the addition of lead and cobalt metal driers and aliphatic solvent as above, hard, glossy, opaque films were obtained.

EXAMPLE 11

Preparation of a copolymer comprising styrene, methyl methacrylate and polymer units as above-defined in which:

$R_1$=safflower fatty acids residue
$R_2$=H
$n$=3
$R_5$=H
$R_6$=COOH

An addition polymer is first prepared and the repeating units formed in situ by a subsequent reaction.

The following materials were added to a reaction vessel fitted with a stirrer, condenser and inert gas supply:

| | Parts |
|---|---|
| Sodium methoxide | 0.9 |
| Iso-propanolamide | 76.0 |

The mixture was heated to 110° C. under an atmosphere of nitrogen and 140 parts of the methyl ester of soya oil fatty acids added to it over a period of 15 minutes.

The vessel was then subjected to a vacuum of 500 mm., maintaining the temperature at 110° C. and 25 parts of liquid, analysed as being essentially methanol, allowed to distil off. A yield of approximately 190 parts of safflower mono-iso-propanolamide was obtained.

A polymer according to the invention was then prepared by the general method of Example 6 but replacing the safflower monoethanolamide of that example with the above mono-iso-propanolamide.

EXAMPLE 12

Preparation of a copolymer comprising styrene, methyl methacrylate and polymer units as above-defined in which:

$R_1$=safflower fatty acids residues
$R_2$=H
$n$=2
$R_5$=H
$R_6$=COOH

The polymer is formed by addition polymerisation and concurrent formation of the above polymer units.

270 parts of safflower monoethanolamide and 366 parts of xylene were placed in a reaction vessel, stirred and heated to reflux under a slight nitrogen pressure. A mixture of 145 parts of styrene and 104 parts of methyl methacrylate was added to the charge at a uniform rate over a period of 3 hours. Starting at the same time as the above addition a solution of 6 parts of di-tert-butyl peroxide and 76 parts maleic anhydride in a mixture of 15 parts N,N-dimethylformamide and 146 parts xylene was added at a uniform rate over a period of 4 hours. Reflux was continued a further 2 hours. A sample of this polymer solution was then formulated into a fast-drying enamel as follows:

| | Parts |
|---|---|
| Rutile titanium dioxide | 16.2 |
| Copolymer solution of this example (51% solids by weight) | 26.0 |
| 52% linseed/wood oil glycerol phthalate alkyd resin solution, 50% total solids | 26.0 |
| Aliphatic solvent (boiling range 95–130° C.) | 15.0 |
| Iso-propanol | 6.0 |
| Aliphatic solvent (boiling range 150–200° C. and aromatic content approximately 20%) | 10.8 |
| Cobalt octoate (6% weight metal) | 0.3 |

The titanium dioxide was mixed with 7 parts of the alkyd resin solution, 2 parts iso-propanol and 8 parts aliphatic solvent (boiling range 95–130° C.) and the mixture ground in a porcelain ball mill with porcelain balls. The remaining copolymer solution and the other components were added and the mixture blended to yield a paint having a viscosity of approximately 25 seconds in a Ford No. 4 viscosity cup.

The enamel thus-prepared was sprayed onto primed steel panels at a wet film thickness of 0.003 inch and allowed to air-dry at 25° C. The film was dust free in 20 minutes, tack free in 1 hour and print free after 20 hours. The film was petrol resistant after 24 hours and could be recoated without fry after this period. The film had excellent gloss, appearance, hardness and general resistance properties after 2 days air-drying.

EXAMPLE 13

Preparation of a copolymer similar to that of Example 12 but replacing the methyl methacrylate of that example with styrene.

The general method of Example 12 was repeated but the 104 parts of methyl methacrylate were replaced by an equal weight of styrene. A film catalysed and prepared as described in Example 6 was touch dry in 1 hour and petrol insensitive after 40 hours at 25° C.

EXAMPLE 14

Preparation of a copolymer comprising styrene and polymer units as above-defined in which:

$R_1$=lauryl
$R_2$=H
$n$=2
$R_5$=H
$R_6$=a carboxyl ester of a glycidyl-terminated branched chain saturated hydrocarbon The polymer is formed by addition polymerisation and concurrent formation of the above polymer units.

118 parts of lauryl monoethanolamide, 67 parts of a commercial grade of 3,5,5-trimethylhexanol containing approximately 5% of isomeric alcohols and 413 parts of xylene were placed in a reaction vessel, stirred, heated to reflux under a slight nitrogen pressure and 415 parts of styrene added at a uniform rate over a period of 2 hours. Starting at the same time as the above addition a solution of 4 parts di-tert-butyl peroxide and 82 parts maleic anhydride in 20 parts of N,N-dimethylformamide and 194 parts xylene was added at a uniform rate over a period of 3 hours. Reflux was continued for a further 4 hours. The reaction mixture was then cooled to 125° C. and 120 parts of n-butanol and 126 parts "Cardura" E (a branched-chain fatty acid glycidyl ester, registered trademark of Shell Chemicals) were added. The reaction mixture was maintained at this temperature for 3 hours after which the acid value was found to be equivalent to 16 mg.

KOH per gm. solid. A sample of this polymer solution was then formulated into an enamel as follows:

| | Parts |
|---|---|
| Rutile titanium dioxide | 95 |
| Copolymer solution of this example | 123 |
| A commercially available butylated melamine/formaldehyde condensate (60% solids by weight) | 86 |
| Condensation product of epichlorohydrin and bisphenol A having an epoxide equivalent of 450 to 525 | 25 |
| Xylene | 51 |
| n-Butyl acetate | 21 |
| Poly(propylene glycol) molecular weight approximately 3500) | 3 |

The titanium dioxide was mixed with 40 parts of copolymer solution and 10 parts of xylene and the mixture ground in a porcelain ball mill with porcelain balls. The remaining copolymer solution and other components were added and the mixture blended to yield a paint having a viscosity of 35 seconds in a Ford No. 4 viscosity cup. The formulation was then reduced to a spraying viscosity of 21 seconds in a Ford No. 4 viscosity cup by the addition of xylene.

The enamel thus prepared was sprayed onto both primed and unprimed steel panels at a film thickness of 0.002 inch and cured for 20 minutes at 175° C. The films had the following properties, the ratings being compared with a typical commercial thermosetting acrylic 'appliance' enamel as a control.

| | |
|---|---|
| Gloss (60° head) | 94—superior to control. |
| Hardness (Tukon tester) | 16 Knoop—equal to control. |
| Adhesion to zinc phosphate treated steel. | Excellent—equal to control. |
| 500 hours salt spray exposure (unprimed). | Excellent—superior to control. |
| 500 hours salt spray exposure (primed). | Do. |
| 100 hours detergent immersion (unprimed). | Do. |
| xylene/n-butyl acetate resistance | Excellent—equal to control. |

EXAMPLE 15

Preparation of a copolymer comprising styrene and polymer units as above-defined in which:

$R_1$=coconut fatty acids residue
$R_2$=H
$n$=2
$R_5$=H
$R_6$=carboxy nonyl ester The polymer is formed by addition polymerization and concurrent formation of the above polymer units.

The following materials were charged into a reaction vessel fitted with a stirrer, reflux condenser, Dean and Stark trap and nitrogen feed:

| | Parts |
|---|---|
| Xylene | 413 |
| Nonanol [1] | 67 |
| Coconut monoethanolamide | 118 |

[1] A commercial mixed isomers grade of nonyl alcohols.

The batch was heated to reflux and 415 parts of styrene added to it at a uniform rate over a period of 2 hours. Concurrent with the start of the addition of styrene, the following mixture:

| | Parts |
|---|---|
| Di-tert-n-butyl peroxide | 4.0 |
| Maleic anhydride | 82.0 |
| N,N-dimethyl formamide | 20.0 |
| Xylene | 194.0 | was also added to the batch at a uniform rate but over a period of 3 hours.

After these additions were completed, refluxing was continued for a further 4 hours. A total of 9 parts of water was collected in the reflux trap.

The product was a copolymer solution with the following characteristics:

Gardner-Holdt viscosity—X
Total solids by weight—48%
Acid value—98.7 mgm. KOH per gm.

This copolymer solution was formulated into a coating composition by the general method of example 6 and films formed therefrom dried in air at ambient temperature in less than 1 hour.

EXAMPLE 16

Preparation of a copolymer of methyl methacrylate and polymer units as defined above, in which:

$R_1$=safflower fatty acids residue
$R_2$=H
$n$=2
$R_5$=CH$_3$
$R_6$=H

An acidic copolymer is first prepared and then modified to form in situ the above units. The carboxy-containing copolymer so-prepared is dissolved in an aqueous liquid in the presence of a water-soluble base and electrophoretically deposited as a coating film on a steel panel.

A reaction vessel fitted with a stirrer and reflux condenser was charged with 100 parts of toluene, which was heated to reflux temperature. Five feed mixtures were prepared according to the following table:

| | Methyl methacrylate, parts | Methacrylic acid parts | Toluene, parts | Benzoyl peroxide, parts |
|---|---|---|---|---|
| Feed Number: | | | | |
| 1 | 18.96 | 1.06 | 50 | 0.40 |
| 2 | 18.29 | 1.71 | 50 | 0.40 |
| 3 | 17.76 | 2.24 | 50 | 0.40 |
| 4 | 17.46 | 2.54 | 50 | 0.40 |
| 5 | 16.97 | 3.03 | 50 | 0.40 |

The feed mixtures were added consecutively and in the order given to the refluxing batch at a uniform rate over a period of 35 minutes each. During this time the batch temperature was maintained at 111–111.5° C. Refluxing was continued for a further hour at 111.5° C. after the additions were completed. A solution of an acidic methyl methacrylate copolymer containing 12 mole percent of methacrylic acid was formed.

300 parts of reflux condensate was then removed from the batch and the following mixture added:

| | Parts |
|---|---|
| Ethylene glycol mono-n-butyl ether | 75.0 |
| Trichloroacetic acid | 0.1 |
| Safflower monoethanolamide | 13.0 |

Heating was resumed to reflux temperature (127° C.) and reflux condensate removed until a steady reflux was achieved at 170° C. Refluxing was continued for a further hour, when the acid value of the copolymer had fallen to 39.3 mgm. KOH per gm. of solid polymer.

To the above solution was added 25 parts of ethylene glycol mono-n-butyl ether, the batch cooled to 50° C., 15 ml. of a 20% solution of potassium hydroxide in water and 65 parts of water added. Stirring was continued until the temperature fell to room temperature.

A clear aqueous solution of polymer, dilutable at least 200% with water was formed.

A sample of the above polymer solution was diluted to 10% solids by weight with demineralised water, adjusted with caustic potash solution to a pH of approximately 7.7 and electrophoretically deposited onto steel panels as anodes, using a 60 v. D.C. current source and a deposition time of 2 minutes. The films were cured by baking for 20 minutes at 350° F. and formed tough, coherent coatings.

EXAMPLE 17

Preparation and electrodeposition onto steel of a polymer according to the invention.

40 parts of methyl ethyl ketone were charged to a reaction flask and heated to the reflux temperature. A mixture of 37.4 parts of styrene, 18.7 parts of acrylic acid, 1.12 parts of azodiisobutyronitrile and 2.78 parts of tertiary dodecyl mercaptan was then added to the flask over 2 hours and refluxing continued for about 10 hours until conversion was substantially complete. The solids content of the product was 56.5%.

81.3 parts of linseed oil fatty acids were charged to a reaction flask and heated to 100° C. 18.7 parts of monoethanolamine were then added slowly to the flask and the mixture heated to 150° C. A small quantity of cyclohexane was then added to the flask and water of reaction removed at a temperature not exceeding 100° C. until the acid value was less than 10 mg. KOH/g.

67.4 parts of the solution of styrene/acrylic acid copolymer obtained above was heated to 90–100° C. and 32.6 parts of the above linseed oil fatty acids monoethanolamide slowly added. Heating was continued at not higher than 165° C. and, in order to help in removing water from the reaction, a small quantity of xylene was added. Heating was stopped when the acid value of the product was 74 mg. KOH/g. and the solids content was then 95% 115.6 parts of this product were stirred with 21.9 parts of butyl "Cellosolve" to provide an 80% solids solution and then diluted with demineralised water with agitation in the presence of 12.2 parts of 20% by weight aqueous potassium hydroxide to provide a polymer dispersion of 10% solid content having a pH of 7.8.

Bare steel and phosphated steel panels were coated using the aqueous emulsion at 125 volts and a temperature of 30° C. The coulomb yield was 24.5 mg./coulomb. The coatings after stoving at 165° C. for 30 minutes were smooth and glossy. Similar results were obtained when the emulsion was pigmented with titanium dioxide and red iron oxide.

EXAMPLE 18

Preparation and electrodeposition onto steel of a polymer according to the invention.

21.8 parts of maleic anhydride and 21.8 parts of methyl isobutyl ketone were charged to a reaction flask and heated to reflux temperature. 41.5 parts of diisobutylene (60% L-isomer), 1.55 parts of benzoyl peroxide (60% paste), and 13.35 parts methyl isobutyl ketone were added over 2½ hours and heating continued for 10 hours to substantially complete conversion. The final product had solids content of 67.5% and acid value 428 mg. KOH/g.

54.5 parts of this product were heated under reflux and 45.5 parts of linseed oil fatty acids monoethanolamide, prepared according to Example 17, were added slowly. Water was removed whilst maintaining reflux conditions until the final acid value was 84 mg. KOH/g. The final solids content was 84%.

The final condensation product was converted to an aqueous colloidal dispersion of 10% solids content, as described in Example 17 and electrodeposited onto bare steel and phosphated steel panels at 150 volts and 30° C. Smooth and glossy coatings were obtained on bare steel; smooth and matt coatings were obtained on phosphated steel.

We claim:

1. An ethylenically unsaturated monomer of the formula:

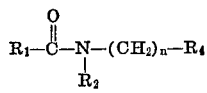

wherein $n$ is an integer having the value 2 to 18 inclusive, $R_1$ is a saturated or unsaturated linear or branched hydrocarbon chain containing 12 to 18 inclusive carbon atoms, $R_2$ is a hydrogen atom, a methyl, hydroxy alkyl, saturated or unsaturated alkyl group containing 2 to 18, inclusive carbon atoms, an alkyl-aryl or cycloalkyl group or a group of the structure:

wherein $R_3$ is a hydrogen atom, a methyl, hydroxy alkyl, alkyl-aryl or cycloaryl group or a saturated or unsaturated alkyl group containing 2 to 18 inclusive carbon atoms and $R_4$ is an ethylene derivative of the structure:

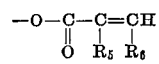

wherein $R_5$ may be hydrogen, chlorine, methyl, methyl carboxy or methyl carboxy ester and $R_6$ may be hydrogen, methyl, carboxyl, carboxy ester or amide.

2. An ethylenically unsaturated monomer according to claim 1 in which $R_1$ is at least one member selected from the group consisting of a lauryl, myristyl, palmityl, stearyl, oleyl, linoleyl and linolenyl entity.

3. An ethylenically unsaturated monomer according to claim 1 in which $R_4$ is selected from the group consisting of an acrylate, maleate, fumarate, maleamate, chlor-maleate, methacrylate, itaconate and aconitate entity.

4. An addition polymer comprising monomer residues of the structure:

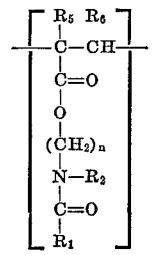

wherein $R_1$, $R_2$, $R_5$, $R_6$ and $n$ have the meanings according to claim 1.

5. A film-forming polymer comprising at least 5% by weight of monomer residues according to claim 4.

6. A solution or dispersion of a polymer according to claim 5 in an aqueous liquid characterised in that the said polymer contains carboxyl groups neutralised by at least one water-soluble base selected from the group consisting of ammonia, monoethanolamine, diethanolamine, triethanolamine, N-methyl ethanolamine, N-aminoethyl ethanolamine, ethylene diamine, diethylenetriamine, propylene diamine, triethylamine, dimethyl aminoethanol, sodium hydroxide and potassium hydroxide.

7. A coating bath for use in electrodeposition comprising a solution or dispersion of colloidal dimensions of a polymer according to claim 6 in which the acid value of the carboxyl group-containing polymer is in the range of 30–200 mg. KOH and 30–100% of the carboxyl groups are neutralised in the coating bath by the water-soluble base.

References Cited
UNITED STATES PATENTS
3,509,111  4/1970  Samour _____ 260—78.5

JOSEPH L. SCHOFER, Primary Examiner

J. KIGHT III, Assistant Examiner

U.S. Cl. X.R.

260—32.4, 32.6, 33.2, 41, 78, 78.4, 78.5, 404, 404.8; 117—132, 161, 167; 204—181